Patented Sept. 7, 1943

2,328,548

UNITED STATES PATENT OFFICE 2,328,548

THERAPEUTICALLY VALUABLE DERIVATIVE OF SULFONES

Max Döhrn and Walter Schoeller, Berlin-Charlottenburg, Otto Albert Alhard Laubereau, Berlin-Neukolln, Hermann Fox, Berlin-Frohnau, Erich Leckzyck, Berlin-Halensee, and Hans Herloff Inhoffen, Berlin-Wilmersdorf, Germany, assignors to Schering Corporation, Bloomfield, N. J., a corporation of New Jersey No Drawing. Application May 17, 1940, Serial No. 335,868. In Germany May 27, 1939

1 Claim. (Cl. 260—397.6)

This invention relates to derivatives of sulfones and more particularly to therapeutically valuable sulfones and a method of making the same.

As particularly effective agents against infections caused, for example, by cocci, such as gonococci, streptococci and the like, there have proved derivatives of sulfones, as for instance, diphenylsulfones, being substituted in 4,4'-position by nitro- or amino groups; these effects, however, are connected with a high toxicity. And this is the reason, why these derivatives of sulfones do not have therapeutical value. Thus, for instance, in mice tests the 4,4'-diamino diphenyl sulfone is about 100 times more effective against streptococci than the sulfanilic acid amide but at the same time 25 times as toxic as the latter (compare, for instance, Lancet, vol. 232, page 1332).

Now, it has been found, that other derivatives of sulfones may be produced which are considerably free from poisonous effects without showing decreased effectiveness. These sulfones correspond to the general formula:

$$X.OC.HN.R.SO_2.R'.NYY''$$

In this formula there represent:

R and R': aromatic and/or heterocyclic radicals,

Y: hydrogen, a hydrocarbon or acyl radical, which may also be substituted by OR'' or NHY', or the COX'-group, X: the groups OR'', NHY' or $$NH.R.SO_2.R'NYY''$$

X': the group OR'' or NHY',

R'': a hydrocarbon radical,

Y': hydrogen, a hydrocarbon radical, which may be substituted, for instance, by —COOH and the like, Y'': hydrogen or a hydrocarbon radical.

These new, valuable compounds are produced by two principally different methods, namely (1) By those, in which the residues $$Y''Y N.R'.SO_2R- \text{ or } Y''Y N.R'.SO_2R.NH-$$

are preformed and the residues —NH.CO.X— or —CO.X are introduced, or (2) By those, in which the —NH.CO.X group is already contained in the molecule or in parts of the same, while the sulfone group is to be produced.

The methods, for producing these new sulfones, as described under (1) are known per se and are used, for example, in the manufacture of "Dulcin," a urea derivative of phenetidine (see, for instance, Apothekerzeitung, vol. 9 (1894) page 200 ff.; Journal für praktische Chemie (2), vol. 30 (1884), page 103 and the German Patents Nos. 63,485, 76,596, 77,420 and 79,718).

The preferably applied method consists in reacting sulfones of the general formula $$Z.R.SO_2R'.Z'$$

wherein R and R' indicate aromatic and/or heterocyclic radicals, while Z represents a free or substituted amino group, the substituent of which is not acted upon by carbonic acid halogenide, said substituent being, for instance, an alkyl or acyl radical, or a group convertible into an amino group, for instance, a nitro, azo group, halogen, or the like, and Z' is an amino group, whereby Z and Z' are suitably in p-position to the sulfone group, with carbonic acid halogenides or their esters, such as phosgene, chloro carbonic acid esters and others, whereupon subsequently the reaction products are converted by methods known per se, in case the reaction was carried out with phosgene so as to yield a compound of the general formula $Z.R.SO_2.R'.NH.CO.Cl$, into the carbalkoxy amino compounds, or by reaction with ammonia or agents, capable of yielding ammonia, such as ammonium carbonate and the like, or amino compounds, such as amino acid, amino pyridine and others into the corresponding urea compounds. Hereafter, if necessary, Z may be transformed into the free amino group. This conversion, for instance, by means of reduction or reductive splitting off, or by treatment with ammonia or sodium amide, or by saponification, has to be carried out so carefully, that a splitting off of the CO.X-group formed before does not take place.

The manufacture of these new sulfones is also possible by directly reacting the sulfones of the above general formula $Z.R.SO_2.R'.Z'$ with an alkalicyanate, suitably in the presence of glacial acetic acid, or with a urea halogenide, for instance, urea chloride, or even with urea, its salts or monoacyl derivatives, suitably by heating, whereupon Z is converted into the amino group, if need be.

The second method consists, for instance, in converting compounds, already containing a NH.CO.X group, into sulfones. For this purpose already known methods may be used, such as are described among others in Houben "Die Methoden der organischen Chemie, 3rd edition, vol. 3, page 1278 ff. According to these methods sulfides of the formula $X.OC.HN.R'.S.R.NYY''$ as they are obtainable, for instance, by reacting mercapto compounds of the general formula X.OC.HN.R'.SO.Me, where R' and X have the above given meaning while Me indicates a metal, especially an alkali metal, such as the sodium compound of a thiophenol urea, with compounds of the formula Hal.R.Z'' wherein R also has the above given meaning while Z'' represents a group, convertible into the amino group, may be oxidized to sulfones whereby also the intermediately formed corresponding sulfoxydes of the formula X.OC.HN.R'.SO.R.N.YY'' may be used as starting material. As oxidizing agents there may be employed potassium permanganate, chromium trioxide, hydrogen peroxide or other known oxidation agents. Subsequently, if necessary, the amino group or the group —NYY'' may be reformed in the place of Z''-position.

Furthermore, according to this second principal way of procedure, salts of sulfinic acids of the general formula X.OC.HN.R'.SO$_2$.Me, wherein R', X and Me have the above mentioned meaning, may be condensed to sulfones with compounds of the formula Hal.R'.Z'', wherein R also has the above mentioned meaning, while Z'' represents a group, capable of activating a halogen atom and being convertible into the amino group, especially a nitro group (see applications Serial Nos. 237,926 and 371,412, corresponding German applic. Sch. 119,715 IVc/12q). After the condensation Z'' may be transformed into the amino group or the group NYY'', if need be. Instead of the salts of sulfinic acid also sulfinic acids of the formula X.OC.HN.R'.SO$_2$H, wherein R' and X have the above given meaning, or their amides may be reacted with amino compounds of the aromatic or heterocyclic series, suitably in the presence of halogen hydride or of a halogen hydride salt of the corresponding amino compound.

Furthermore, also the halogenides of the above mentioned sulfinic acids may be reacted with amino compounds of the formula R.NYY'', the amino group of which is suitably protected, for instance, by acylation (see application Ser. No. 314,512). With especially high yield the new sulfones may be obtained by condensation of compounds of the formula X.OC.HN.R'.SO$_2$.Hal with compounds of the formula R.NYY'', wherein R, R', X and Y'' have the above shown meaning while Y represents an alkyl, especially a methyl radical, or an acyl radical, capable of being readily split off, such as an acetyl radical or the like, said condensation preferably being carried out in the presence of aluminum chloride. The condensation product is then subjected, if required, to partial saponification in order to split off the acyl group. The condensation in the presence of aluminum chloride may also be carried out by reacting compounds of the formula X.OC.HN.R' with compounds of the formula Hal.SO$_2$.R.NYY'' whereafter the condensation product is partly saponified.

These products may also be obtained, although with less yield, by condensation of compounds of the formula X.OC.HN.R'.SO$_3$H with compounds of the formula R'.NYY'', such as acetanilide, by heating in the presence of an agent capable of splitting off water, such as phosphorus pentoxide and the like, or likewise by condensation of compounds of the formula X.OC.HN.R', for instance, of phenyl urea, with compounds of the formula HO$_3$S.R.NYY'', whereupon, in both cases, the amino group may be reformed.

Furthermore, to these methods there belong all those, by which—in the same manner as mentioned under (1) carbalkoxy or urea sulfones are obtained from sulfones of the formula

Z.R.SO$_2$.R'.Z'

—also from sulfides or sulfoxides of the formulae Z.R.S.R'.Z' or Z.R.SO.R'.Z', wherein R, R', Z and Z' have the above given meaning, the corresponding carbalkoxy or urea sulfides or sulfoxides are obtained. These compounds are oxidized in known manner to the corresponding sulfones, whereupon, if necessary, Z may be transformed into the amino group.

Of course, other methods hitherto used for the preparation of sulfones may be employed, whereby, however, care has to be taken that the substituents X and Y are not disadvantageously influenced during reaction.

Derivatives of sulfones, prepared according to this invention, may be converted in the same manner, as described, for instance, in application Ser. No. 367,224 (appln. corresponding to German appln. No. Sch. 119,519 IVd/22a) into azo compounds, capable of forming water-soluble salts, said azo compounds corresponding to the general formula Az.R.SO$_2$.R'.NH.CO.X, wherein R, R' and X have the above given meaning, while Az indicates an azo group with an aromatic or heterocyclic radical, containing at least one, but preferably several groups, capable of forming water-soluble salts. These sulfone derivatives may be used for injections on account of their solubility in water.

The following examples serve to illustrate the invention without, however, limiting the same to them.

*Example 1*

Into a boiling solution of 2 grs. of 2-amino-4'-acetyl amino diphenyl sulfone in 50 ccs. of dioxane there is introduced phosgene until the solution is saturated therewith. The excess of phosgene is removed by passing through dried nitrogen gas. The light yellow solution is concentrated in vacuum to a small volume and treated with cold water, whereby a colourless solid mass is obtained, which may be filtered off by suction. This solid fraction is washed with water, dried in a vacuum desiccator, and recrystallized from amyl alcohol. Thus, bis-(acetyl-amino-diphenyl sulfone)-urea is obtained melting at 239–240° C. with decomposition.

This substance is heated in 18–20% hydrochloric acid for about 30 minutes to boiling, whereby it is completely dissolved and transformed to bis-(amino-diphenyl sulfone)-urea. This substance is recrystallized from methanol and melts at 227–228° C.

*Example 2*

10 grs. of 4-nitro-4'-amino diphenyl sulfone (melting point 169–170° C.), obtained from 4-nitro-4'-acetylamino diphenyl sulfone by saponification, are dissolved in 400 ccs. of hot toluene and a stream of phosgene is passed into the boiling solution for about 15 minutes until saturation. Then the solution is worked up according to Example 1. By recrystallisation from a mixture of equal volumes of alcohol and acetone the bis-(nitro diphenyl sulfone)-urea is obtained melting at 265° C. with decomposition. 10 grs. of said substance are suspended in 150 ccs. of alcohol and to this suspension there is added a mixture of 44 grs. of zinc chloride in 100 ccs. of alcohol, saturated with hydrogen chloride, whereby the temperature increases to about 60° C. Then, the mixture is heated for 1 hour on the water bath and is brought to dryness in a desiccator. The residue is rendered strongly alkaline by addition of a 33% sodium hydroxide solution while cooling, whereupon the mixture is extracted with acetic acid ester. The acetic acid ester solution is dried by means of calcium chloride and after evaporation to a small volume is mixed with petrol ether. On standing for several hours the bis-(amino diphenyl sulfone)-urea is filtered off by suction and recrystallized from methanol. Melting point 227–228° C.

The reduction of the nitro group may also be carried out by means of sodium hydrosulfite as well as by means of catalytically activated hydrogen.

Example 3

100 grs. of 4-nitro-4'-amino diphenyl sulfone are dissolved, while stirring in 500 ccs. of glacial acetic acid at a temperature of 90° C., whereupon the solution is cooled down to a temperature of 70° C. Then 80 grs. of calcium cyanate are added under continuous stirring to the solution in the course of about one hour, whereby the temperature is maintained at about 70° C. At the end of adding the cyanate, the solution may be heated, if necessary. After having introduced about half of the calcium cyanate a precipitate begins to form, which is filtered off by suction after standing for about 20–24 hours. The filtered residue is triturated with 20% of hydrochloric acid, again filtered off by suction, first washed with 20% hydrochloric acid and then with water, and finally dried. Thus, 4-nitro-4'-ureido diphenyl sulfone of melting point 215–216° C. is obtained in a crude yield of 85 grs. On recrystallisation from about 1000 ccs. of boiling glacial acetic acid 43.5 grs. of the pure product having a melting point of 220–221° C. are isolated. The mother liquor, evaporated to dryness in vacuo, yields about 8.5 grs. of the same product, thus, giving a total yield of 52 grs. corresponding to 45.5%.

On catalytic hydrogenation in the presence of platinum black 4-amino-4'-ureido diphenyl sulfone is obtained therefrom.

The reduction may also be carried out as follows:

32 grs. of 4-nitro-4'-ureido diphenyl sulfone are gradually mixed while stirring with 170 ccs. of a solution of 450 grs. of $SnCl_2.2H_2O$ in 1000 ccs. of glacial acetic acid into which dry hydrogen chloride gas was passed. Thereby the reaction mixture in which the temperature increases by itself, is kept at a temperature below 65° C. Thereupon the mixture is stirred for two further hours at about 60° C. The tin double salt formed after standing for several hours is transformed into the free base by methods known per se. The 4-amino-4'-ureido-diphenyl sulfone obtained on recrystallisation from alcohol melts at 202–203° C.

One may also reduce the 4-nitro-4'-ureido-diphenyl sulfone by means of a nickel catalyst as follows:

64 grs. of the nitro compound are reduced in 1000 ccs. of ethyl alcohol in the presence of 10 grs. of a nickel catalyst in a manner known per se. Thereafter about 1000 ccs. of ethyl alcohol are added, the solution heated to boiling, filtered off from the catalyst and the filtrate concentrated by evaporation. 58 grs. of 4-amino-4'-ureido diphenyl sulfone of melting point 200–201° C. corresponding to a yield of 86.3% (crude product) are obtained in crystalline form.

Example 4

A solution of 5.6 grs. of nitro-4'-amino diphenyl sulfone and 4.8 grs. of urea in 60 ccs. of glacial acetic acid are heated for 15 hours to 105–110° C. After cooling the solution is precipitated with twice its volume of water. After standing for several hours, the precipitate formed is filtered off by suction and carefully washed with water. Thereupon, the residue is dissolved while heating in 75 ccs. of glacial acetic acid, the solution is filtered, freed by filtration from crystals precipitated after standing for several hours, said crystals representing a by-product of melting point 265° C., and then precipitated by water. After allowing the precipitate to settle, it is again filtered off by suction and recrystallized two to three times from 50% acetic acid. Thereby 4-nitro-4'-ureido diphenyl sulfone of melting point 222° C. (yield: 2.5 grs.) is obtained.

Example 5

5.6 grs. of 4-nitro-4'-amino diphenyl sulfone are dissolved at room temperature in 25 ccs. of dioxane. While excluding any moisture and avoiding any increase of temperature phosgene is introduced into this solution. After several minutes a yellow precipitate is formed, but which gradually dissolves. After having introduced phosgene into the solution for about 15 minutes, a carbamic acid chloride crystallizes in the form of a light-yellow product. For its complete precipitation, 50 ccs. of absolute ether are added to the reaction mixture. The remaining phosgene is eliminated by passing through a stream of dry air, the precipitate is then filtered off by suction and washed with absolute ether. By this method the carbamic acid chloride in almost quantitative yield is obtained, melting at 160–162° C. thereby decomposing. On introducing the carbamic acid chloride into an excess of concentrated ammonia a yellow precipitate is formed, which, after standing for several hours, is filtered off by suction and washed with water. This precipitate represents the 4-nitro-4'-ureido diphenyl sulfone, melting at 222° C. thereby decomposing. Yield: almost quantitative.

Example 6

To a solution of 5 grs. of 4,4'-diamino diphenyl sulfone in 60 ccs. of glacial acetic acid 4 grs. of kalium cyanate are added in the course of 10 minutes. After allowing the solution to stand for 24 hours, the solution is completely precipitated by water, the crystalline precipitate filtered off by suction and triturated in the cold with 10% hydrochloric acid in order to remove eventually present starting material. After a further filtration, the precipitate is washed with water and recrystallized from 50% acetic acid. After two recrystallizations, the 4-acetyl amino-4-ureido diphenyl sulfone has a melting point of 254° C. (thereby decomposing).

By careful saponification the acetyl group may be split off thereby producing the corresponding amino compound.

Example 7

1.6 gr. of urea chloride are introduced into a solution of 5.6 grs. of 4-amino-4'-nitro diphenyl sulfone in 25 ccs. of acetone, to which 1.6 grs. of pyridine have been added. During the introduction of the urea chloride, the temperature increases to 30–40° C. After allowing the reaction mixture to stand for some time the 4-ureido-4'-nitro diphenyl sulfone crystallizes and is filtered off by suction, washed with water and recrystallized from 50% acetic acid. M. P. 225–226° C. Yield: 80–85%. The reduction to the 4-ureido-4'-amino diphenyl sulfone may be carried out as described in Example 3.

Example 8

0.8 gr. of the carbamic acid chloride, as obtained according to Example 5, are introduced into 12 grs. of aniline whereby reaction takes place under development of heat. The mixture finally solidifies. After standing for two hours the aniline chlorohydrate formed and the excess of aniline are removed by washing with water and dilute hydrochloric acid, the residue is dried and recrystallized from alcohol. The 4-nitro-4'-carbaminyl anilido diphenyl sulfone forms yellowish prisms, which melt at 129–130° C. under lively development of gas, solidify again at 140–160° C. and finally melt at 200° C. Yield: 0.75 gr.

Example 9

0.5 gr. of carbamic acid chloride, as obtained according to Example 5, are introduced into a solution of 0.4 gr. of p-aminobenzoic acid in 6.5 ccs. of dioxane whereby the temperature of the mixture slightly increases. On standing for several hours a precipitate forms, which is filtered off by suction, washed with dilute hydrochloric acid, and recrystallized from alcohol. Light-yellow needles of 4-nitro-4'-(carbaminyl aminobenzoic acid)-diphenyl sulfone are obtained thereby which melt at 253° C. thereby decomposing, after changing colour from about 230° C. upwards. The compound is soda-soluble and is precipitated from a soda solution by acids.

Example 10

32 grs. of crude 4-nitro-diphenyl-sulfone-4'-carbaminic acid chloride are dissolved in 420 ccs. of dioxane and the clear solution is then added to 20 grs. of glycocoll ethyl ester. After the reaction is finished and after standing for several hours the solution is filtered off by suction, the precipitate washed with water and recrystallized from glacial acetic acid. The 4-nitro-diphenyl-sulfone-4'-ureido-acetic acid ethyl ester obtained melts at 228–229° C. Yield: 20 grs.

3.8 grs. of this ester are suspended in 25 ccs. of concentrated hydrochloric acid. After addition of 6.8 grs. of SnCl$_2$.2H$_2$O in 25 ccs. of concentrated hydrochloric acid, the solution is heated to about 70° C. The clear solution obtained by this reaction, which lasts for about ¾ hour, is separated by filtration by suction from the precipitate formed on standing for 12 hours, and the tin double salt filtered off is dissolved in 2% hydrochloric acid. From this solution the tin is precipitated by means of hydrogen sulfide. After filtration crystals are obtained by evaporation of the filtrate in a vacuum, which on precipitation from their solution in sodium hydroxide solution by means of acetic acid, have a melting point of 228–229° C. and represent the 4-amino diphenyl sulfone 4'-ureido acetic acid. Yield: 20 grs.

Example 11

A solution of 115 grs. of 4-amino-4'-nitro diphenyl sulfide in 600 ccs. of dioxane is added to a solution of 105 grs. of phosgene in 500 ccs. of dioxane while stirring at room temperature. Thereafter the stirring is continued for one more hour, whereupon the precipitate formed is filtered off by suction and introduced into 750 ccs. of 25% ammonia while stirring. After standing for several hours it is again filtered off by suction, the residue washed with water and dried. Melting point 202–203° C. on recrystallisation from 50% acetic acid. Yield: 160–170 grs.

150 grs. of the thus obtained 4-ureido-4'-nitro diphenyl sulfide are dissolved in about 1 l. of hot glacial acetic acid and the solution, after adding 180 grs. of a 30% solution of hydrogen peroxide, corresponding to 3 mols, is heated on the water bath for two to three hours. Cooled, the quite pure 4-ureido-4'-nitro diphenyl sulfone, which crystallizes, is filtered off by suction. M. P. 225° C. Yield: 80%.

The reduction of this sulfone to 4-ureido-4'-amino diphenyl sulfone may be carried out according to Example 3.

Example 12

28 grs. of 4-amino-4'-nitro diphenyl sulfone are dissolved in 130 ccs. of dioxane and 7 ccs. of pyridine. To this solution there are added drop by drop 8.3 ccs. of chlorocarbonic acid ethyl ester at a temperature of 40–50° C. The precipitate, formed after standing for a rather long period of time, is filtered off by suction and washed with water, M. P. 214–15° C., on recrystallisation from glacial acetic acid. Yield: 24 grs. of 4-nitro-4'-carbethoxyaminodiphenylsulfone.

The same compound is also obtained with a good yield on boiling 4-nitro-diphenyl-sulfone-4'-carbaminic acid chloride in alcohol for about an hour.

6.0 grs. of 4-nitro-4'-carbethoxyaminodiphenylsulfone and 3 grs. of a nickel-catalyst in 200 ccs. of ethyl alcohol are shaken at 40–50° C. with hydrogen, until the calculated amount is absorbed. Duration of the hydrogenation: about 8 hours. The solution is filtered while hot and the residue is washed with hot alcohol. After cooling, pure 4-amino-4'-carbethoxy amino diphenyl sulfone with a M. P. of 228° C. precipitates from the filtrate. Yield: 80%.

Example 13

42 grs. of 4,4'-diamino diphenyl sulfone are dissolved in 20 ccs. of acetone. After addition of 17 ccs. of pyridine at 0° C. 1.8 grs. of chlorocarbonic acid ethyl ester are added to the solution. The precipitate of 4-amino-4'-carbethoxyamino diphenyl sulfone, crystallizing on standing for a rather long period of time, is filtered off by suction, washed with water and several times recrystallized from alcohol. M. P. 226–228° C. On this reaction 4,4'-di-(carbethoxy amino)-diphenyl sulfone is obtained as by-product, which, owing to its low solubility in alcohol, may be easily separated from the 4-amino-4'-carbethoxyamino diphenyl sulfone.

Example 14

4.2 grs. of 4'-carbethoxyamino-4-ureido diphenyl sulfone, obtained in an analogous manner as described in Example 12 by reacting amino ureido diphenyl sulfone instead of 4-amino-4'-nitro diphenyl sulfone with chlorocarbonic acid ethyl ester, are boiled in 240 ccs. of 50% sulfuric acid for 15 minutes and then filtered while still hot.

On cooling the sulfuric acid salt of the base crystallizes, and is filtered and converted into the free base 4-amino-4'-carbethoxyamino diphenyl sulfone. M. P. 227–228° C., on recrystallisation from alcohol.

Example 15

3.5 grs. of chlorocarbonic acid ethyl ester are introduced, while cooling by means of water, into a solution of 8.7 grs. of 4'-amino-4-acetylamino diphenyl sulfone, dissolved in 25 ccs. of acetone, to which 3 ccs. of pyridine have been added. After finishing the reaction by slightly heating on a water bath, the 4'-carbethoxyamino-4-acetylamino diphenyl sulfone crystallizes on cooling, and is filtered off by suction, washed with water, and recrystallized from glacial acetic acid. It melts at 243° C., thereby decomposing. Yield: 8.2 grs. On partial saponification, as described in Example 14, the 4'-carbethoxyamino-4-amino diphenyl sulfone is obtained. M. P. 228° C.

*Example 16*

50 grs. of p-carbethoxy-aminobenzolsulfinic acid, 44 grs. of p-bromo nitrobenzene and 30 grs. of anhydrous potassium acetate in 50 ccs. of methanol are heated in an autoclave up to 120-130° C. for 5 to 6 hours while stirring all the time. The reaction product is filtered off by suction, extracted first with water and then with ether to remove the non-reacted bromo nitro benzene whereupon the residue is recrystallized from glacial acetic acid. M. P. 214° C. Yield: 20-25 grs. The nitro compound obtained is then subsequently reduced to 4'-carbethoxyamino-4-amino diphenyl sulfone, as described in Example 12.

*Example 17*

To 26 grs. of carbethoxyaminobenzosulfonic acid chloride and 13 grs. of acetanilide suspended in carbon disulfide, there are added portion by portion 28 grs. of aluminum chloride. Towards the end of the reaction the evolution of hydrochloric acid gas is accelerated by heating on the water bath. The reaction finished, the solvent is evaporated to a large extent either directly or in a low vacuum, the residue, while still warm, is diluted with ice-water and then worked up in the usual manner.

The reaction product, p-carbethoxyamino-p'-acetyl-amino diphenyl sulfone, crystallizes from glacial acetic acid with a melting point of 244-245° C.

10.0 grs. of this sulfone are dissolved in 50 ccs. of formic acid and boiled with 50 ccs. of concentrated hydrochloric acid. On cooling the partly saponified compound crystallizes from the reaction mixture, to which the same volume of water was added. The p-carbethoxyamino-p'-amino diphenyl sulfone obtained has a melting point of 229-230° C. on recrystallisation from alcohol. Yield: 90%.

*Example 18*

The same amounts of starting material, as given in Example 17, are dissolved in tetrachloro ethane, the aluminum chloride is added in small portions and at the end of the reaction the mixture is heated in a Babo's funnel. After introducing into ice-water, the organic solvent is steam-distilled, whereby at the same time, partial saponification takes place. The chlorohydrate of p-carbethoxyamino-p'-aminodiphenyl sulfone obtained is then converted into the free base.

*Example 19*

To a solution of 5.6 grs. of 4-nitro-4'-amino diphenyl sulfone in 50 ccs. of pyridine there is added while stirring at −10 to −15° C. a solution of 2 grs. of phosgene in 20 ccs. of pyridine made at −15° C. After keeping the reaction mixture for 30 minutes at this low temperature and for several hours at about 0° C. it is precipitated by addition of a little water. Yellow needles of bis-(4-nitro diphenyl sulfone)-4'-urea are obtained in a yield of 5.4 grs. which on recrystallisation from pyridine melt at 272-274° C. thereby decomposing.

*Example 20*

To a solution of 5.6 grs. of 4-nitro-4'-amino diphenyl sulfone in 50 ccs. of pyridine there is added, while stirring, at −10 to −15° C. a solution of 3 grs. of carbonic acid dibromide in 25 ccs. of pyridine, said solution made at −15° C. After standing for about 30 minutes at this low temperature the temperature is gradually allowed to rise to 17-20° C., whereupon after standing for 10-12 hours water is added to the reaction mixture causing precipitation of N,N'-bis(4-nitro diphenyl sulfone)-4'-urea which forms yellow needles and melts after recrystallisation from pyridine at 272-274° C. thereby decomposing. Yield: 5.0 grs.

*Example 21*

To a solution of 5.0 grs. of 4-amino-4'-nitro-diphenyl sulfide in 20 ccs. of dioxane with addition of 1.6 ccs. of pyridine there are added at about 40-50° C. 2.2 grs. of chloro carbonic acid ethyl ester, whereupon the reaction mixture is heated for a short time on the steam bath and poured into a large volume of ice water. The precipitate formed, the 4-nitro-4'-carbethoxyamino diphenyl sulfide, is filtered off by suction, washed with water and recrystallized from methanol or glacial acetic acid. M. P. 132-133° C. Yield: about 70%.

On oxidizing this compound with 4 mols of hydrogen peroxide 4-nitro-4'-carbethoxy amino diphenyl sulfone having a melting point of 215-216° C., thereby decomposing, is obtained.

*Example 22*

A suspension of 390 grs. of 4-nitro-4'-amino diphenyl sulfide in 600 ccs. of dioxane is added in small portions while stirring to a solution of 200 grs. of phosgene in 500 ccs. of dioxane at a temperature of 20-25° C. Thereupon the reaction mixture is continued to be stirred for 1 hour at the same temperature, filtered off by suction, pressed in order to remove most of the adhering mother liquor, and the filtered residue introduced, while stirring, into 1.5 l. of 25% ammonia. Stirring is continued for about 3 further hours. After allowing the reaction mixture to stand for several hours it is filtered off by suction and the precipitate washed with water. After repeated recrystallisation from 50% acetic acid the 4-nitro-4'-ureido diphenyl sulfide melts at 204-205° C. (uncorrected).

80 grs. of the same are then dissolved, while heating, in 800 ccs. of glacial acetic acid. To this solution there are added 2 mols of 30% hydrogen peroxide solution and the reaction mixture is heated on the steam bath. As soon as the reaction temperature has increased to about 95° C., there are added two more mols of hydrogen peroxide, thereby keeping the temperature at about 95° C. Thereafter the reaction mixture is continued to be heated on the water bath for some time. Complete oxidation requires about 4 hours. On cooling 4-nitro-4'-ureido diphenyl sulfone crystallizes from the solution in a yield of about 70%. On recrystallisation from formic acid it shows a melting point of 225-226° C.

Example 23

45 grs. of crude 4-nitro diphenyl sulfone-4'-carbaminic acid chloride are heated with 45 ccs. of benzyl alcohol for 1½ hours on the steam bath. Reaction takes place under lively development of hydrogen chloride gas. After the gas development has ceased the reaction mixture is cooled, filtered off, and the filtered residue recrystallized from glacial acetic acid. The 4-nitro-4'-carbaminobenzyloxy diphenyl sulfone, obtained in a yield of 35–40 grs., has a melting point of 187–189° C.

Example 24

5.6 grs. of 4-amino-4'-nitro diphenyl sulfone are dissolved in 25 ccs. of dioxane, to this solution there are added 1.5 ccs. of pyridine and 3.5 grs. of chloro carbonic acid benzyl ester. Reaction takes place with simultaneous increase of temperature. After heating for about 30 minutes on the water bath and cooling the reaction mixture is poured into ice water. The precipitate is filtered off by suction and recrystallized from glacial acetic acid. Yield: 4.0–4.5 grs. of 4-nitro-4'-carbaminobenzyloxy diphenyl sulfone of M. P. 187–188° C.

Example 25

37.8 grs. of p-phthalamido-p'-amino diphenyl sulfone of M. P. 265° C., obtained by heating phthalic acid anhydride and p-amino-p'-nitro diphenyl sulfone in glacial acetic acid, fusing the N-(p'-nitro diphenyl sulfone)-p-phthalaminic acid of M. P. 191° C. at 200° C., and reducing the p-phthalamido-p'-nitro diphenyl sulfone of M. P. 255° C. by means of iron turnings in formic acid in the presence of hydrochloric acid or by means of catalytically activated hydrogen in the presence of nickel-catalyst according to Raney in absolute alcohol, are reacted in 100 ccs. of dioxane with a solution of 10 grs. of phosgene in dioxane according to Example 5. The carbaminic acid chloride obtained is reacted with concentrated ammonia as described in the same Example 5, whereby p-phthalamido-p'-ureido-diphenyl sulfone is obtained.

Example 26

N-(p'-amino diphenyl sulfone)-p-phthalaminic acid, obtained either by reducing N-(p'-nitro diphenyl sulfone)-p-phthalaminic acid by means of iron turnings and formic acid or by hydrolyzing p-phthalamido-p'-amino diphenyl sulfone by means of 10% alcoholic potassium hydroxide solution, is reacted in dioxane in the presence of pyridine with chloro carbonic acid ethyl ester at about 40–50° C. with subsequent heating on the steam bath, whereby N-(p'-carbethoxy amino diphenyl sulfone)-p-phthalaminic acid is formed.

Example 27

95 grs. of N,N'-bis-(4'-nitro diphenyl sulfone)-4-urea, obtained, for instance, according to Example 2, are suspended in 1000 ccs. of formic acid and heated to 75° C., while stirring. 72 grs. of iron turnings and 382 ccs. of concentrated hydrochloric acid are added in small portions. After about 2 hours the hydrogen development ceases. The reaction mixture is then filtered through asbestos and the filtrate poured in 10 times its volume of ice water. The precipitate is purified by precipitating its solution in boiling alcohol with water. The bis-(4'-amino diphenyl sulfone)-4-urea of M. P. 236° C. is obtained in a yield of 30 grs.

Example 28

400 grs. of p-carbethoxyamino-p'-nitro diphenyl sulfone, obtained, for instance, according to Example 12, are suspended in 3000 ccs. of formic acid. 200 ccs. of hydrochloric acid are then added to this suspension at 50° C. while stirring, and thereupon under simultaneous heating to 70° C. in small portions 320 grs. of iron turnings which have been activated by means of concentrated hydrochloric acid. Hydrogen development takes place, whereby the temperature increases to 95–100° C. After addition of 320 grs. of iron turnings and 700 ccs. of concentrated hydrochloric acid the temperature of the reaction mixture is raised to 100° C., at which it is kept for 1 hour. After the reaction is finished, the hot reaction mixture is filtered through asbestos and the filtrate poured in 10 times its amount of ice water. The colourless precipitate is filtered off by suction, washed with water and recrystallized from a mixture of equal parts of concentrated hydrochloric acid and water, to which 25% of its volume of formic acid was added. The yield of p-carbethoxy-p'-amino diphenyl sulfone of M. P. 229–230° C. obtained thereby, amounts to 230 grs.=63% of the theoretical yield.

Example 29

26.3 grs. of p-carbethoxy amino benzene sulfo chloride and 13.5 grs. of acetanilide are suspended in 150 ccs. of nitrobenzene and mixed with 26 grs. of aluminum chloride in 50 ccs. of nitrobenzene. After heating for 1 hour at 120–130° C. and cooling 15 ccs. of concentrated hydrochloric acid are added and the nitrobenzene distilled off in a vacuum. The residue is triturated with water and filtered off from the undissolved product which is washed with water and recrystallized from alcohol. It represents the p-carbethoxy-amino-p'-amino diphenyl sulfone of M. P. 229° C. The acetyl group of the acetanilide is split off during the reaction.

Example 30

44 grs. of p-carbethoxy amino benzene sulfinic acid are boiled with 31.6 grs. of 2-chloro-5-nitro pyridine and 19.6 grs. of potassium acetate in 1000 ccs. of alcohol for 7 hours. The crystals precipitated are filtered off and recrystallized from glacial acetic acid. 40 grs. of p-carbethoxyamino phenyl-p'-nitro pyridyl sulfone of M. P. 195° C. are obtained. On reducing the same in an analogous manner as described in Examples 2, 3, 10, 12, 25, 26 and the like p-carbethoxy amino phenyl-p'-amino pyridyl sulfone is obtained.

Example 31

9.2 grs. of p-carbethoxy amino benzene sulfinic acid are gradually introduced into 50 ccs. of thionyl chloride and the reaction mixture is heated for a short period of time on the water bath. On cooling, p-carbethoxy amino benzene sulfinic acid chloride of M. P. 138° C. crystallizes. 70 grs. of the same are added to 150 grs. of aniline and the mixture heated for about 60 minutes on the water bath. After cooling the reaction mixture is added to a mixture of 2 N sodium hydroxide solution and ether. After shaking the layers are separated and the aqueous alkaline layer is filtered off by suction. The residue is dissolved in 2 N hydrochloric acid solution and again precipitated with 2 N sodium hydroxide solution. Compact needles of p-carbethoxy amino-p'-amino diphenyl sulfoxide are obtained, 20 grs. of which are boiled in about 100 ccs. of acetic acid anhydride for 15 minutes. Thereupon the reaction mixture is mixed on the water bath with alcohol until the excess of acetic acid anhydride is destroyed. On cooling p-carbethoxy amino-p'-acetyl amino diphenyl sulfoxide crystallizes in fine colourless needles of M. P. 274° C.

100 grs. of the same are oxidized in about 50 ccs. of glacial acetic acid with 5% aqueous potassium permanganate solution. On cooling p-carbethoxy amino-p'-acetyl amino diphenyl sulfone crystallizes in needles of M. P. 283° C.

10 grs. of the sulfone are heated in a mixture of equal parts of formic acid concentrated and hydrochloric acid for 10 minutes on the water bath. On cooling 8 grs. of p-carbethoxyamino-p'-amino diphenyl sulfone of M. P. 229° C. is obtained in fine needles.

The partial saponification may also be carried out by boiling in a mixture of 8 parts of alcohol and 2 parts of concentrated hydrochloric acid, where, however, 2 hours are required for completing the reaction.

*Example 32*

26 grs. of p-carbethoxyamino pyridine sulfochloride in 100 ccs. of nitrobenzene are mixed with 13.5 grs. of acetanilide and 30 grs. of aluminum chloride in 50 ccs. of nitrobenzene are added in small portions to the reaction mixture. After heating for about 1 hour at 120° C., distilling off the nitrobenzene, and adding about 15 ccs. of concentrated hydrochloric acid and 100 ccs. of water, the residue is filtered off by suction and washed with a large amount of water. Thus, 4-(2-carbethoxyamino pyridyl)-4'-amino phenyl sulfone is obtained.

*Example 33*

5.6 grs. of 2-amino pyridine-5-sulfonic acid are intimately mixed with 2.75 grs. of sodium bicarbonate and a small amount of water. After heating for a short period of time the reaction mixture is evaporated to dryness in a vacuum and dried at 200° C. in a vacuum. Thereupon it is mixed with double its amount of acetic acid anhydride and boiled for 1 hour under reflux. After cooling the excess acetic acid anhydride is destroyed by means of alcohol on the water bath and mixed with the same volume of water. On cooling crystals of the sodium salt of 2-acetylamino pyridine-5-sulfonic acid are obtained which are transformed into the free acid of M. P. 300° C. by precipitation of their aqueous solution with concentrated hydrochloric acid.

10 grs. of the absolutely dry potassium salt of the 2-acetylamino pyridine-5-sulfonic acid are heated in a sealed glass tube with phosphorus pentachloride to 160° C. On reducing the sulfochloride with sodium sulfite in weakly alkaline solution in an analogous manner as is known for p-carbethoxy amino benzene sulfochloride, the corresponding sulfinic acid is obtained.

50 grs. of 2-acetyl amino pyridine-5-sulfinic acid are boiled with 49.7 grs. of 2-chloro-5-nitro pyridine and 24.9 grs. of potassium acetate in 1000 ccs. of alcohol for 8 hours under reflux. On cooling crystals of 2-acetylamino-2'-nitro dipyridyl-5,5'-sulfone are obtained which on reduction, as described above, for instance, according to Examples 2, 3, 10, 12, 25, 26 and the like yield (2-acetylamino-2'-amino dipyridyl)-5,5'-sulfone.

*Example 34*

208 grs. of 4-carbethoxybenzene sulfinic acid are heated with 389 grs. of methylaniline for 8 hours on the steam bath. The crystal paste forming in the beginning dissolves in the course of 2–3 hours. The solution becomes more and more deeply violet and drops of water separate. After cooling and standing for a longer period of time, the content of the reaction container solidifies to a crystal paste which is filtered off by suction and washed on the filter first with acetic acid ester and then with ether. The 4-monomethyl - 4' - carbethoxy - 4,4' - diamino diphenyl sulfoxide still shows a slight violet colour and has a melting point of 174–175° C. after recrystallisation first from acetic acid ester and then from methanol. It is readily soluble in alcohol, methanol, acetone, chloroform, difficultly soluble in hot acetic acid ester, and insoluble in water and petrol ether. Yield: 157 grs.=54.5%.

157 grs. of this compound are heated with 285 ccs. of acetic acid anhydride for 1 hour on the steam bath. After cooling to room temperature a solution of 55 grs. of chromium trioxide (1.1 mol) in 25 ccs. of water and 200 ccs. of glacial acetic acid are added while stirring whereby care is taken that the temperature in the reaction mixture does not rise above 80° C. After addition of the oxidizing solution the reaction mixture is heated for 45 minutes on the steam bath. After cooling it is then poured slowly into 10 liters of ice water whereby the 4-monomethyl acetyl-4'-carbethoxy-4,4'-diamino diphenyl sulfone precipitates first in syrupy form which shortly becomes crystalline. 162 grs. are obtained=87%. On recrystallisation from methanol the compound shows a melting point of 187° C. It is readily soluble in alcohol, acetone, chloroform, hot acetic acid ester and acetic acid, difficultly soluble in benzene, insoluble in water and petrol ether.

50 grs. of 4-monomethyl acetyl-4'-carbethoxy-4,4'-diamino diphenyl sulfone are heated with a solution of 250 ccs. of concentrated hydrochloric acid and 750 ccs. of alcohol for 2 hours under reflux. Thereafter the solution is concentrated by evaporation in a vacuum to 300 ccs. and poured into 3 liters of ice water, whereby 4-monomethyl - 4'-carbethoxy - 4,4' - diamino diphenyl sulfone precipitates in crystalline form. Yield 41.5 grs.=93%. The product is recrystallized first from glacial acetic acid and then from methanol and melts at 212–213° C. It is readily soluble in acetone, hot dioxane and alcohol, insoluble in water, ether, petrol ether.

*Example 35*

17.4 grs. of 4-ureido-4'-amino diphenyl sulfone are dissolved in 200 ccs. of acetone, to which 5.7 ccs. of pyridine are added. While stirring, then 5.7 ccs. of chloro carbonic acid ethyl ester are introduced, whereby the temperature of the reaction mixture increases to 40–50° C. After allowing the reaction solution to stand for several hours in ice, a crystalline precipitate is obtained, which is filtered off by suction, washed with water, extracted with dilute hydrochloric acid and again washed with water. The 4-ureido-4'-carbethoxyamino diphenyl sulfone obtained melts at 214° C. (thereby decomposing) after recrystallisation from glacial acetic acid.

*Example 36*

10 grs. of 4,4'-diamino diphenyl sulfone are dissolved in 25 ccs. of acetone, to which 6.4 grs. of pyridine are added. Into this solution 6.3 grs. of chloro carbonic acid ethyl ester are introduced in small portions The oily precipitate formed solidifies on treatment with water. It is extracted with dilute hydrochloric acid, subsequently washed with water and recrystallized from pyridine. M. P. 256° C. (thereby decomposing). Yield: 7 grs.

Of course, many changes and variations in the reaction conditions, the starting materials used, the solvents and catalysts employed, the reaction temperature and duration, the methods of isolating and purifying the final products and so forth may be employed by those skilled in the art in accordance with the principles set forth herein and in the claim annexed hereto

What we claim is:

A p,p'-diphenyl sulfone derivative of the formula $NH_2.CO.NH.C_6H_4.SO_2C_6H_4.NH_2$.

MAX DŌHRN.
WALTER SCHOELLER.
OTTO LAUBEREAU.
HERMANN FOX.
ERICH LECKZYCK.
HANS HERLOFF INHOFFEN.